(12) United States Patent
Yamada

(10) Patent No.: US 9,171,177 B2
(45) Date of Patent: Oct. 27, 2015

(54) INFORMATION PROCESSING METHOD FOR EXECUTING A COMMAND INCLUDED IN AN INSTALLER AND A STORAGE MEDIUM STORING A PROGRAM THEREFOR

(75) Inventor: Koji Yamada, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1348 days.

(21) Appl. No.: 12/531,889

(22) PCT Filed: May 28, 2008

(86) PCT No.: PCT/JP2008/060250
§ 371 (c)(1),
(2), (4) Date: Sep. 18, 2009

(87) PCT Pub. No.: WO2008/152954
PCT Pub. Date: Dec. 18, 2008

(65) Prior Publication Data
US 2010/0095294 A1    Apr. 15, 2010

(30) Foreign Application Priority Data

Jun. 12, 2007  (JP) .................................. 2007-155374

(51) Int. Cl.
G06F 9/445    (2006.01)
G06F 21/62    (2013.01)

(52) U.S. Cl.
CPC .............. *G06F 21/6218* (2013.01); *G06F 8/61* (2013.01); *G06F 2221/2141* (2013.01)

(58) Field of Classification Search
USPC ....................................................... 717/174
See application file for complete search history.

(56) References Cited

U.S. PATENT DOCUMENTS

| | | | |
|---|---|---|---|
| 7,496,913 B2* | 2/2009 | Hayes et al. | 717/174 |
| 7,694,296 B1* | 4/2010 | Kennedy | 717/175 |
| 2002/0032870 A1* | 3/2002 | Spusta et al. | 713/201 |
| 2003/0079126 A1 | 4/2003 | Kadam et al. | 713/168 |
| 2006/0171732 A1 | 8/2006 | Yamada | 399/81 |
| 2008/0172736 A1* | 7/2008 | Barr et al. | 726/20 |

FOREIGN PATENT DOCUMENTS

| | | | |
|---|---|---|---|
| EP | 99/64947 | 12/1999 | ............... G06F 1/00 |
| JP | 2002-517853 | 6/2002 | |

OTHER PUBLICATIONS

William R. Stanek, *Introducing Microsoft Windows Vista*, ISBN 13:978-0-7356-2284-5; ISBN-10:0-7356-2284-1 Library of Congress Control No. 200692447, (copyright 2006).

* cited by examiner

*Primary Examiner* — Hang Pan
(74) *Attorney, Agent, or Firm* — Fitzpatrick, Cella, Harper & Scinto

(57) ABSTRACT

Commands such as installation operation and launch program commands need to be executed after appropriately switching between an administrator account and another account, for each command, when an installer constituting a program for readily performing installation operations collectively for a plurality of pieces of software or the like is launched. When an installer is launched in the present invention, process-to-process communication is secured between the processes of an administrator account and a user account, and an account to execute a command included in the installer is determined in the process of the administrator account. If the determination result indicates that the account to execute the command is the user account, the command is executed in the process of the user account rather than in the process of the administrator account.

11 Claims, 14 Drawing Sheets

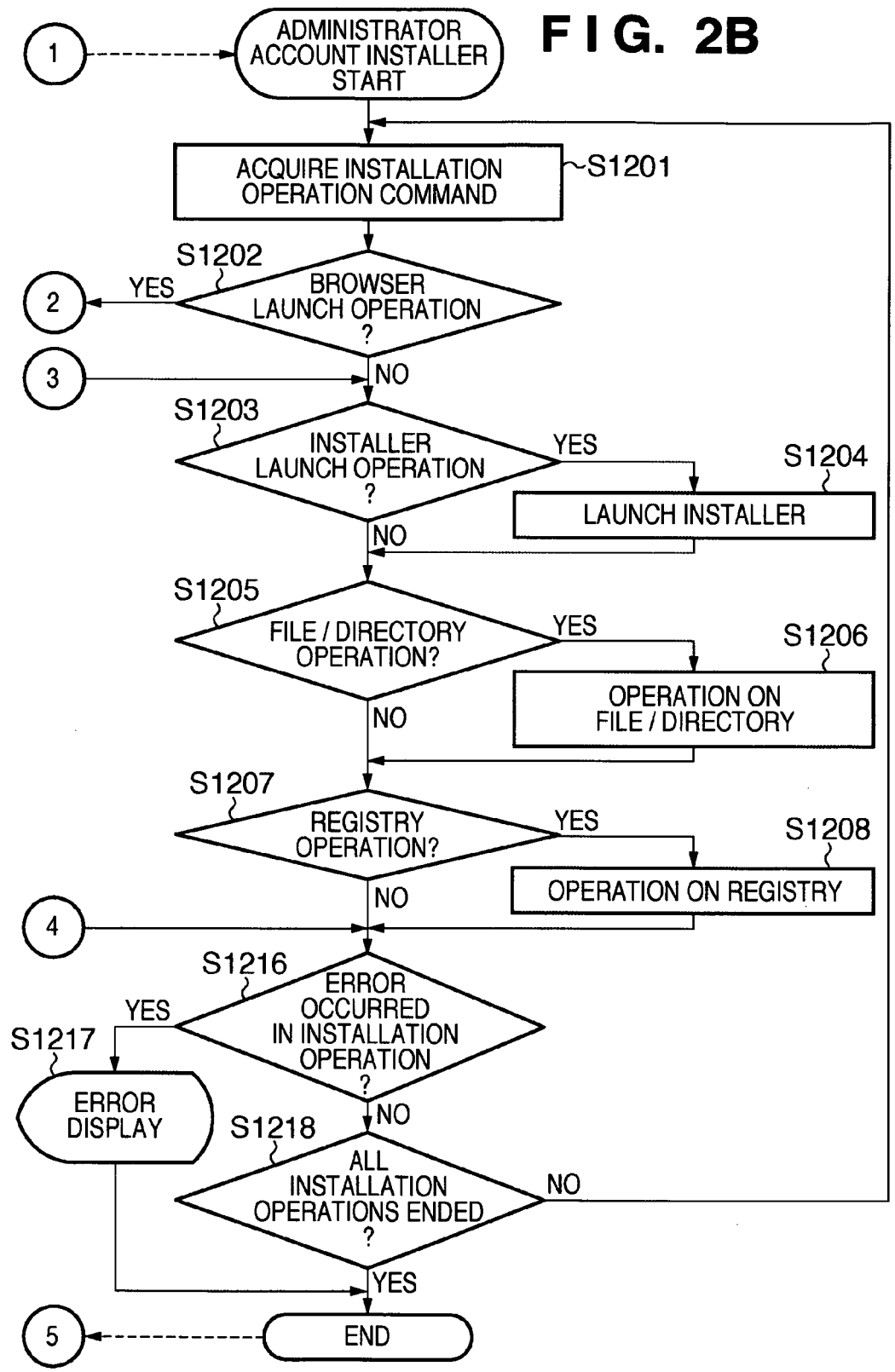

FIG. 3

| COMMAND NUMBER | COMMAND NAME | PARAMETER | OPERATION ACCOUNT | OPERATION OUTLINE |
|---|---|---|---|---|
| CMD101 | LAUNCH INSTALLER | EXECUTABLE FILE NAME | ADMINISTRATOR | LAUNCH EXTERNAL INSTALLER PROGRAM |
| CMD102 | COPY FILE | COPY FILE NAME | ADMINISTRATOR | COPY FILE |
| CMD103 | DELETE FILE | DELETE FILE NAME | ADMINISTRATOR | DELETE FILE |
| CMD104 | RENAME FILE | RENAME FILE NAME | ADMINISTRATOR | CHANGE FILENAME |
| CMD105 | CREATE DIRECTORY | CREATE DIRECTORY NAME | ADMINISTRATOR | CREATE DIRECTORY |
| CMD106 | DELETE DIRECTORY | DELETE DIRECTORY NAME | ADMINISTRATOR | DELETE DIRECTORY |
| CMD107 | WRITE REGISTRY | WRITE REGISTRY NAME | ADMINISTRATOR | WRITE REGISTRY |
| CMD108 | DELETE REGISTRY | DELETE REGISTRY NAME | ADMINISTRATOR | DELETE REGISTRY |
| CMD201 | LAUNCH BROWSER | URL | LOGIN | LAUNCH EXTERNAL WEB BROWSER |

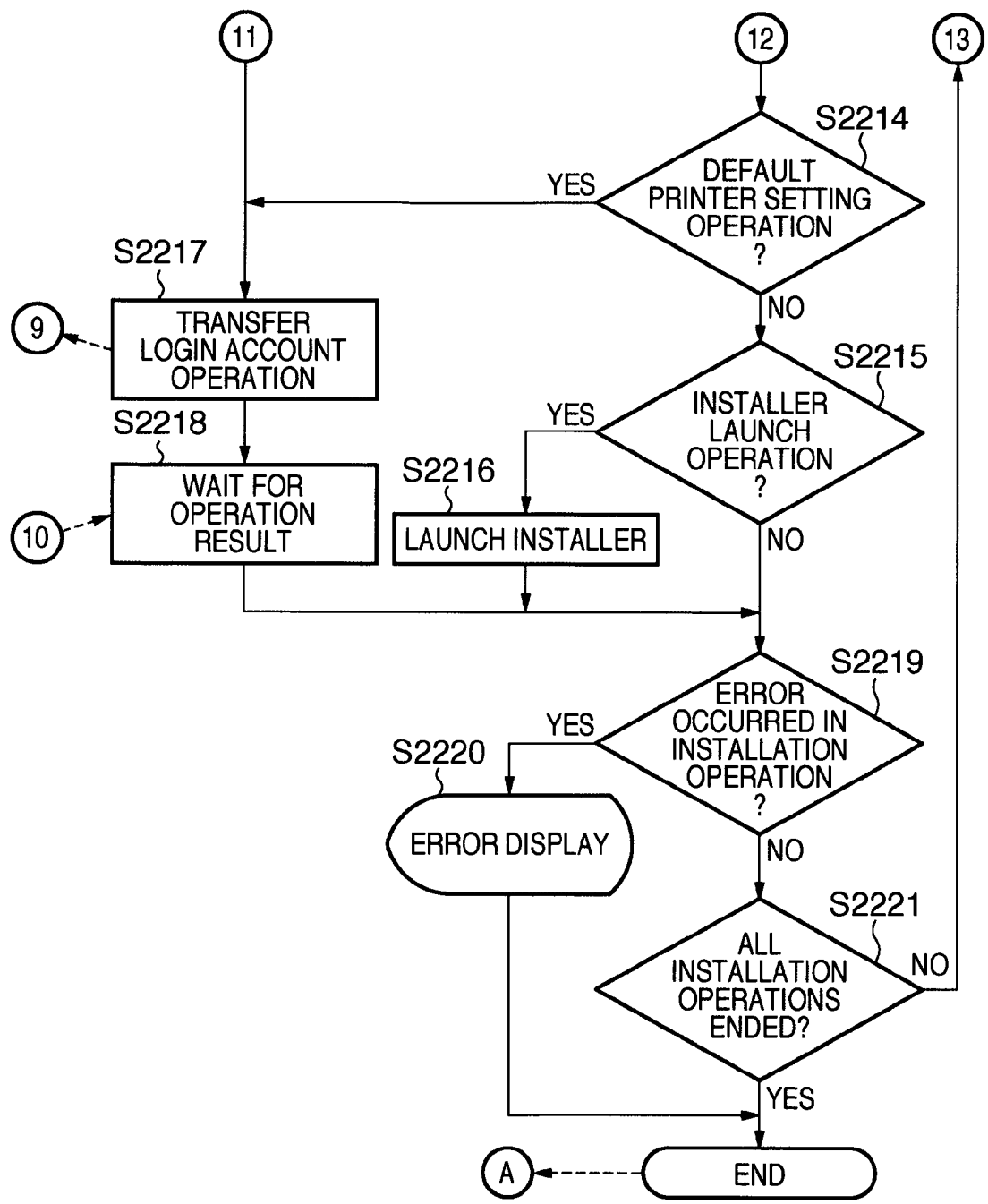

FIG. 7

| COMMAND NUMBER | COMMAND NAME | PARAMETER | OPERATION OUTLINE |
|---|---|---|---|
| CMD301 | LAUNCH INSTALLER | EXECUTABLE FILE NAME | LAUNCH EXTERNAL INSTALLER PROGRAM |
| CMD302 | COPY FILE | COPY FILE NAME | COPY FILE |
| CMD303 | DELETE FILE | DELETE FILE NAME | DELETE FILE |
| CMD304 | RENAME FILE | RENAME FILE NAME | CHANGE FILENAME |
| CMD305 | CREATE DIRECTORY | CREATE DIRECTORY NAME | CREATE DIRECTORY |
| CMD306 | DELETE DIRECTORY | DELETE DIRECTORY NAME | DELETE DIRECTORY |
| CMD307 | WRITE REGISTRY | WRITE REGISTRY NAME | WRITE REGISTRY |
| CMD308 | DELETE REGISTRY | DELETE REGISTRY NAME | DELETE REGISTRY |
| CMD309 | LAUNCH RESIDENT PROGRAM | EXECUTABLE FILE NAME | LAUNCH RESIDENT PROGRAM |
| CMD310 | LAUNCH BROWSER | URL | LAUNCH EXTERNAL WEB BROWSER |
| CMD311 | SET DEFAULT PRINTER | PRINTER NAME | SET DEFAULT PRINTER |

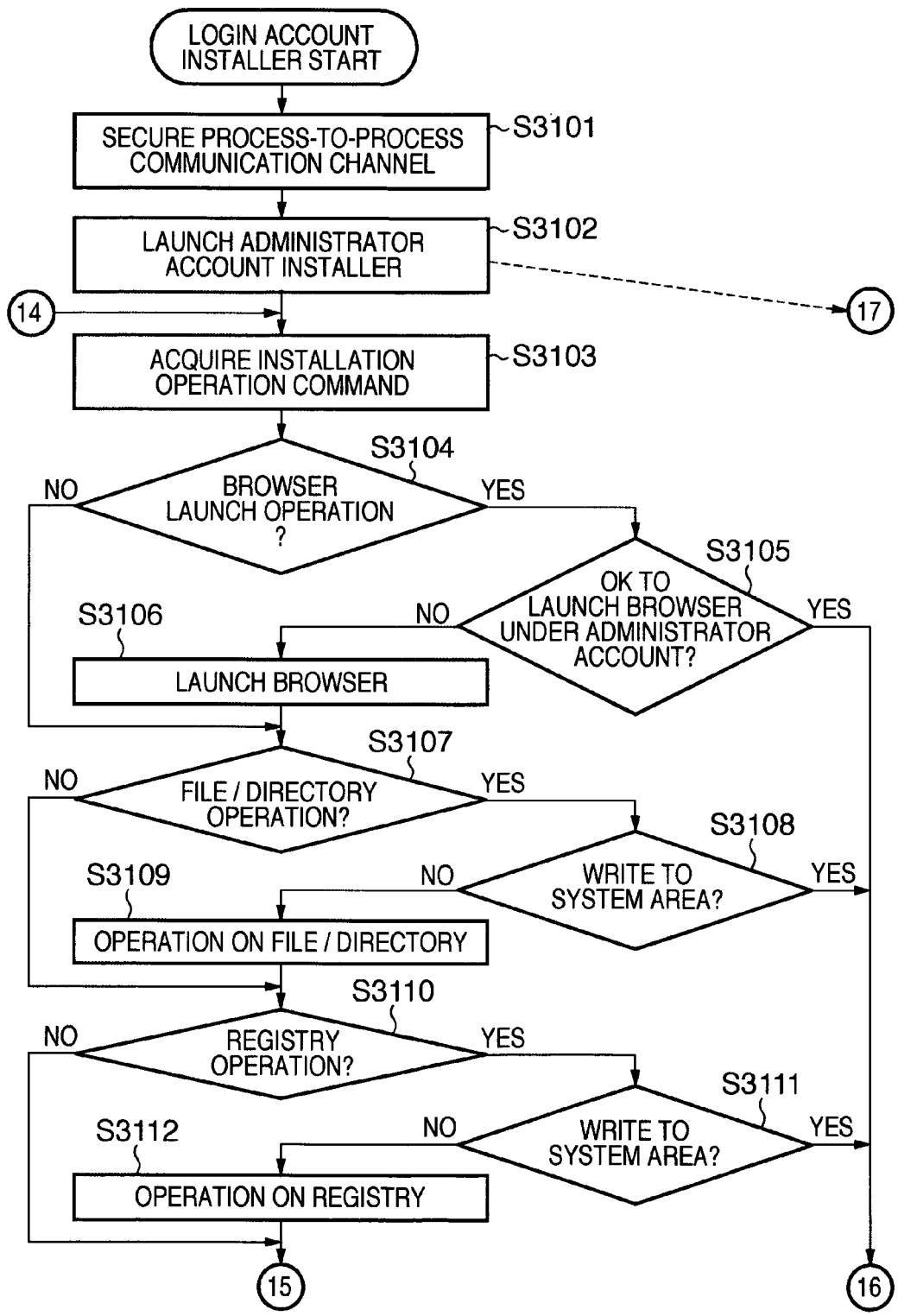

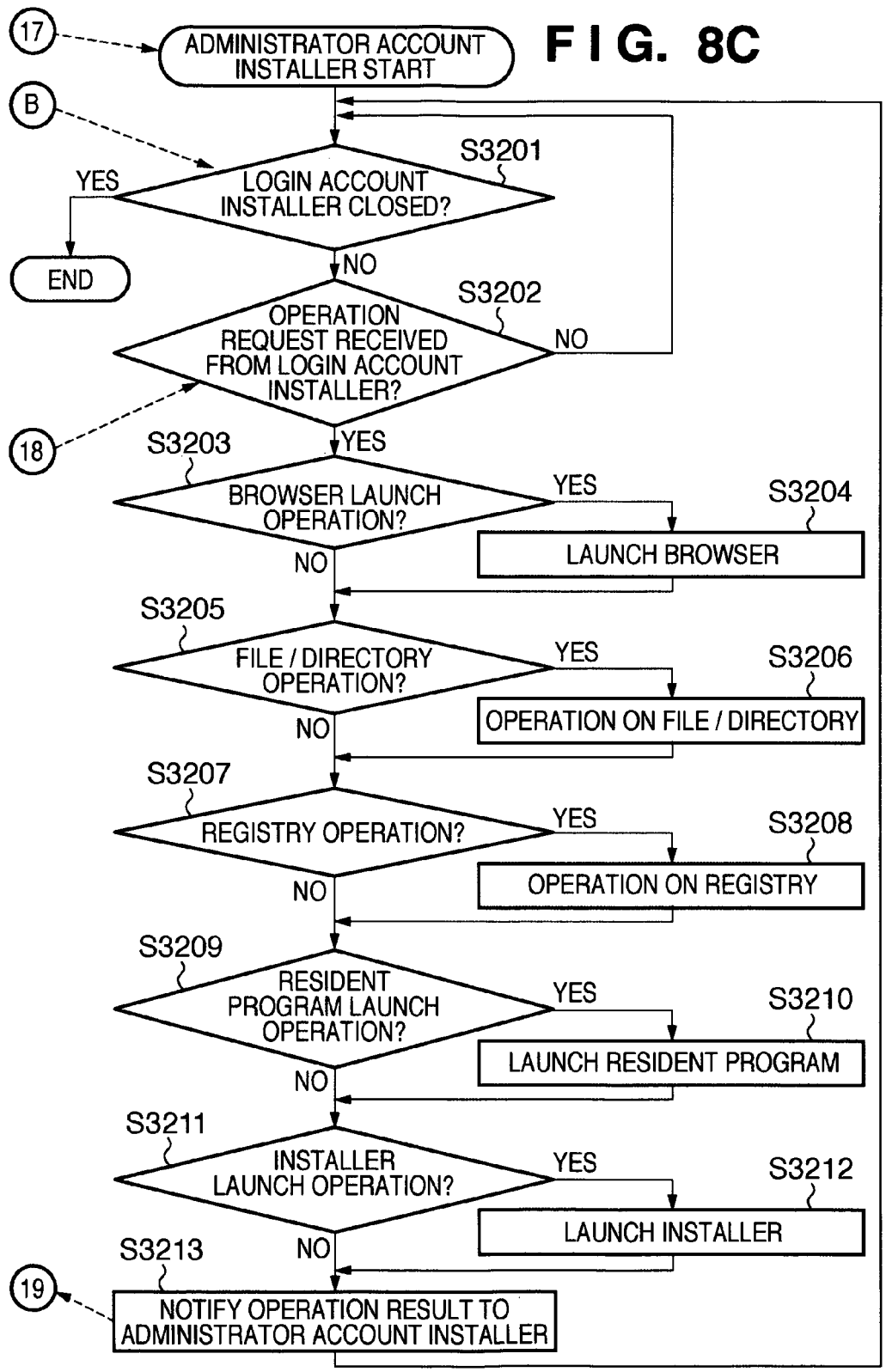

INFORMATION PROCESSING METHOD FOR EXECUTING A COMMAND INCLUDED IN AN INSTALLER AND A STORAGE MEDIUM STORING A PROGRAM THEREFOR

TECHNICAL FIELD

The present invention relates to software installation operations, and more particularly to installation operations in an operating system (OS) in which authorities differ between an administrator account and other accounts such as a general user account.

BACKGROUND ART

With operating systems (OS) such as Microsoft Windows NT (registered trademark) (including its successors such as Windows 2000/XP/Vista (all registered trademarks)), and UNIX (registered trademark), an administrator account and a general user account can be administered separately. Here, an account is an ID for when using a computer. Each account is provided with authorities for using the computer. For example, an administrator account is provided with execution authorities with respect to various operations, such as changing files and registries affecting the entire system. On the other hand, a general user account has limited execution authorities, and is not provided with authorities for executing operations such as changing files and registries affecting the entire system. Therefore, since software cannot be installed on a system with a general user account, an administrator account is required to perform the installation operation.

Even the UNIX (registered trademark) operating system has a special account called a root account. The root account is provided with authorities to change files affecting the entire system, and such authorities are not provided to other accounts.

Passwords are associated with accounts, and when using a computer, the user enters an account name and a password, and performs authentication with the system. This is called login or logon. Login is allowed if the password associated with the account name is correctly entered, thereby enabling the user to use the computer. The account entered when logging in is generally called a login account. The login account may be an administrator account or a general user account. If logging in with an administrator account, the login account is the administrator account, which implies that the user will use the computer as an administrator. If logging in with a general user account, the login account is the general user account, which implies that the user will use the computer as a non-administrator.

Further, in order to perform strict account administration in such operating systems, sub-processes also succeed authorities. In other words, when a program run under an administrator account launches a separate program, that program is also run under the administrator account. Conversely, when a program run under a general user account launches a separate program, that program is also run under the general user account. Heretofore, a program run with a given account could not execute the program of a separate account without a password being entered.

On the other hand, the existence of "malicious software" following the spread of personal computers and the Internet is problematic. An example of this is when software is installed simply as a result of the user accessing a homepage, or when software different from a nominal program is installed when a program attached to an email is run. Such software acts maliciously to send the user's files over the Internet without the user's knowledge or delete the user's local files, and has become a prevalent social problem.

Even with a conventional OS, the user merely needed to ensure to access the Web and view emails when logged in with a general user account, and to install software after logging in with an administrator account. This was enough to prevent "malicious software" from being automatically installed simply as a result of the user accessing a homepage or executing an attached file.

However, users often log in as an administrator account with little restrictions, and use the computer as an administrator. Therefore, the installation of malicious software is not prevented. Also, it is conceivable that users are themselves not aware of whether or not their account is an administrator account or some other account.

With patent document 1 (Japanese Patent Laid-Open No. 2002-517853), processing is normally performed under a general user account or an administrator account with a restricted token. It has also been proposed to restrict operations by providing what were originally administrator authorities to a program when the program is run. An administrator account with a restricted token is an account having the same ID as an administrator account, but with reduced authorities.

For example, in a given OS, even if the user logs in with an administrator account, the account will be treated as an administrator account whose authorities are somewhat restricted, and confirmation will always be required when executing operations that change the system. Operations will not be executed with the true administrator account until the user agrees to this. Similarly, even if the user logs in with a general user account, an account name and password prompt screen will be automatically displayed when executing operations that changes the system and operations will be temporarily executed under the administrator account.

According to this method, confirmation is required before performing an operation that alters the system such as an installation operation, thereby enabling the user to reject the operation.

Also, in another given OS, assume that a special account can be provided for a given operation. By only providing authorities related to printing to a resident program (daemon) related to printing, for example, the system also cannot be altered when there is a bug in the resident program or the resident program related to printing is illegally accessed.

In recent years, a great deal of software has been developed following the spread of personal computers (PCs), and electrical appliances such as digital cameras and printers now typically bundle with plural pieces of software. Electrical appliances that interface with PCs may come with over ten pieces of software when it is purchase.

Software called a master installer (or installer) is typically provided to avoid complication of the software installation procedures due to the increased number of pieces of software. The master installer is support software for sequentially running a plurality of software installers, and allowing the user to perform all of the installation operations as if installing one piece of software.

However, installing software takes time and effort if the administrator account name and password prompt screen is displayed every time the installer is launched, as with patent document 1. Therefore, the possibility arises of not being able to adequately fulfill the original objective of the master installer, which is to provide simple batch installation with minimum effort on the part of the user.

If the master installer is itself run under an administrator account, the administrator account name and password prompt screen is displayed only once, but other problems arise in this case.

One such problem occurs when the master installer is used to execute a program whose operating mode differs depending on whether the program is run with an administrator account execution unit (e.g., process under the control of an administrator account) or with a general user account execution unit (e.g., process under the control of a general user account). For example, assume the default web browser in a given OS is run under a general user account execution unit or the like. Then, if different software from the browser needs to be run in order to open files on the Internet, a high security mode that prevents this will be enabled. Also, when the web browser is run under an administrator account, this high security mode will be disabled. In other words, it will be possible to freely open files on the Internet by executing different software from the browser.

Because the master installer is operated under an administrator account, this high security mode will be disabled if, for example, a given browser is launched from the master installer execution unit, given that the browser is operated under an administrator account. The launching of a browser for performing user registration to web services or the like in customer services, for example, is given as an example of an operation performed using a web browser provided by a master installer. Administrator authorities are not particularly necessary with regard to user registration to web services or the like. In other words, if the aforementioned launching of a browser is performed from a master installer, despite administrator authorities not being particularly necessary, the security level of the user's computer is lowered as a result.

Further, different problems occur in the case where the login account is a general user account. For example, assume a resident program exists that receives data from a scanner and saves the received data in a user default image data folder. Typically, Image data folders are administered per account, and configured so that the image data folders of separate accounts cannot be seen. If this resident program is operated under the login account, the resident program saves the scan data to an image data folder of the login account. However, if the accounts are temporarily switched so that the resident program is operated under an administrator account, the scanner data will subsequently be stored to an image data folder of the administrator account. Therefore, a general user constituting the login user becomes unable to access this scan data. In other words, this problem will arise when a resident program such as this is run in the case where a master installer operates the resident program as an administrator account in order to perform an installation operation.

As a similar example, operating systems have conventionally been provided with a function enabling a default printer to be set. This setting is for determining a printer driver to be chosen by default when the user performs printing, and can also be set separately for each account. In the case where the master installer installs the printer driver, the master installer, after installing the printer driver, sets the installed printer driver as the default printer. However, if the master installer is run under an administrator account, this will not result in a default printer being set in the general user account constituting the login account. In other words, when the user installs a printer driver using the master installer, it is only possible to set the default printer of the administrator account, not his or her own login account which actually needs to be set.

DISCLOSURE OF INVENTION

Therefore, an object of the present invention is to provide an information processing method that enables commands such as installation operation and launch program commands to be executed after appropriately switching between an administrator account and another account, for each command, when an installer is launched, and a computer program for realizing the information processing method.

In view of the above problems, an information processing method of the present invention in an information processing apparatus in which an administrator account and a user account with more limited authorities in the information processing apparatus than the administrator account are registered, and that executes a command included in an installer in a process of each account, includes the steps of determining, in the process of the administrator account, an account to execute the command included in the installer, and executing, if the account to execute the command included in the installer determined in the determining step is the user account, the command included in the installer in the process of the user account, rather than in the process of the administrator account.

Also, a computer program of the present invention is a computer-executable program for providing the information processing method.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIGS. 2A and 2B show flowcharts based on processing steps of the information processing apparatus when a master installer is run in an Embodiment 1.

FIG. 3 shows an exemplary command classification table in Embodiment 1.

FIGS. 5A, 5B and 5C show flowcharts based on processing steps of the information processing apparatus when a master installer is run in an Embodiment 2.

FIG. 7 shows an exemplary command classification table in Embodiment 2.

FIGS. 8A, 8B and 8C show flowcharts based on processing steps of the information processing apparatus when a master installer is run in an Embodiment 3.

BEST MODE FOR CARRYING OUT THE INVENTION

First Embodiment

Figure 1:
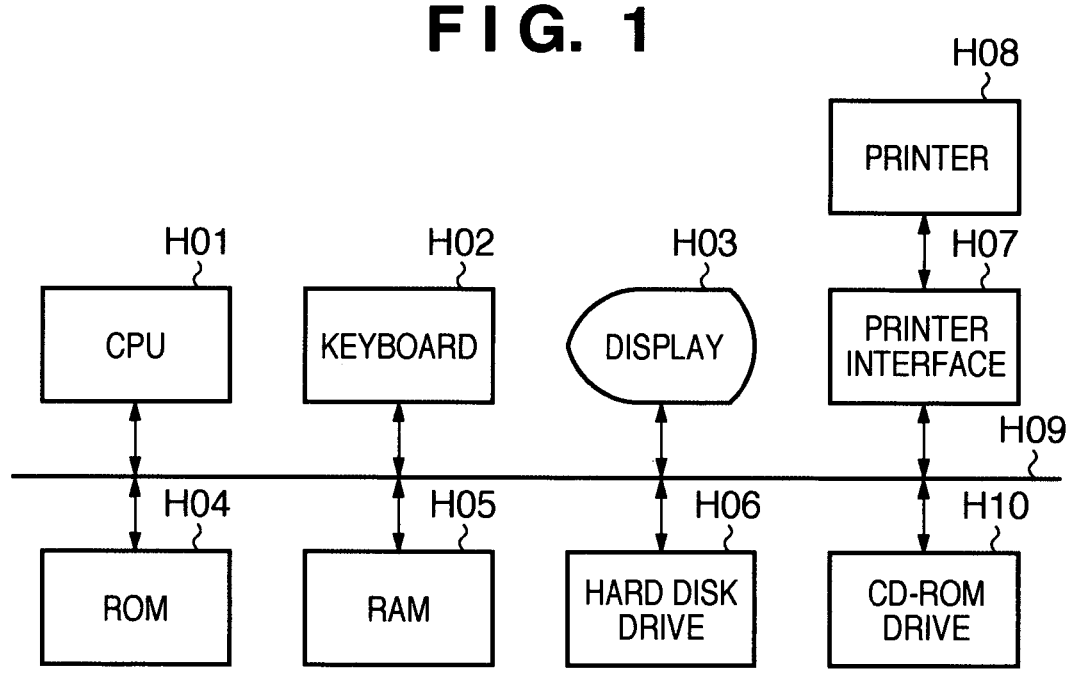
FIG. 1 shows a hardware configuration diagram of an information processing apparatus in the present invention.

Preferred embodiments of the present invention will now be described in detail with reference to the accompanying drawings. The following embodiments are not intended to limit the claims of the present invention.

Firstly, a first embodiment of a preferred master installer of the present invention will be described. The master installer is a program for readily performing installation operations collectively for a plurality of pieces of software or the like. The main operations of the master installer are to copy files to prescribed locations, write registries, and launch separate installers. The master installer might also delete files, launch external programs, and launch resident programs. Further, operations provided by the master installer include a browser launch operation for performing user registration to web services or the like in customer services, in addition to operations such as installing printer drivers and peripheral software, and configuring default settings. Operations performed after launching this web browser do not need to be performed with a process under the control of an account with administrator authorities.

In the first embodiment, commands included in a master installer whose operating mode differ depending on whether the master installer is run with an administrator account execution unit (process under the control of an administrator account) or with a general user account execution unit (process under the control of a user account) will be described.

With commands such as software installation operation commands or a Launch Browser command for performing user registration to web services or the like, the master installer performs the respective commands after switching between account execution units for executing the commands. Specifically, by setting the Launch Browser command as a login account operation command, the launching of a web browser will be performed from the login account, thereby enabling the command to be executed with the high security mode of the web browser enabled.

Here, Internet Explorer 7 (IE7; registered trademark), for example, is given as a web browser.

The master installer of the first embodiment defines installation operations as operation commands, and processes them sequentially. FIG. 3 shows operation commands used in the first embodiment. A command number CMD101 is a Launch Installer command for giving the instruction for an external installation program launch operation. A command number CMD102 is a Copy File command for giving the instruction for a file copy operation. A command number CMD103 is a Delete File command for giving the instruction for a file delete operation. A command number CMD104 is a Rename File command for giving the instruction for a filename change operation. A command number CMD105 is a Create Directory command for giving the instruction for a directory create operation. A command number CMD106 is a Delete Directory command for giving the instruction for a directory delete operation. A command number CMD107 is a registry write command for instructing a registry write operation. A command number CMD108 is a Delete Registry command for giving the instruction for a registry delete operation. A command number CMD201 is a Launch Browser command for giving the instruction for an external web browser launch operation.

These operation commands can take into account the content of an operation, such as the file copy destination or the registry write destination, before it is executed, and determine and set whether the content needs to be processed in an administrator account or a login account. Given that in the first embodiment only the web browser launch operation needs to be executed under a login account, the commands of the command numbers CMD101 to CMD108 are defined as commands to be processed as an administrator account, and the command of command number CMD201 is defined as a command to be processed as a login account.

A master installer program of the first embodiment storing various data such as the commands shown in FIG. 3 is stored in a storage medium such as a CD-ROM, for example, and is provided to a user together with an information processing apparatus such as a printer. The master installer is launched as a result of the user setting this CD-ROM in the information processing apparatus. Here, the master installer can be provided in advance from an Internet site or the like via a network or the like, and launched after having been downloaded to the information processing apparatus.

Next, a hardware configuration (FIG. 1) of an information processing apparatus (PC, etc.) for realizing the master installer in the first embodiment will be described.

A control unit H01 administers overall control in the information processing apparatus. The control unit H01 will subsequently be referred to as CPU H01. A keyboard H02 inputs various data. A color display H03 displays image data stored in a RAM H05. A' ROM H04 is a read-only memory which pre-stores control procedures for controlling the entire apparatus and other required information. The RAM H05 is a random-access memory which is used in running programs and as a work area. A hard disk drive H06 stores programs, together with having various data written thereto and read therefrom. A printer interface H07 has a printer H08 connected thereto. A CD-ROM drive H10 reads out data from a CD-ROM. A data bus H09 has the CPU H01, the keyboard H02, the display H03, the ROM H04, the RAM H05, the hard disk drive H06, the CD-ROM drive H10 and the printer interface H07 connected thereto, and is used for transferring various data between these constituent elements. The hard disk drive H06 or CD-ROMs loaded in the CD-ROM drive H10 will be collectively called external storage device or external storage medium, and store application programs, installers, printer drivers and the like. These various programs are loaded into the RAM H05 and run by the CPU H01.

Figure 2A:
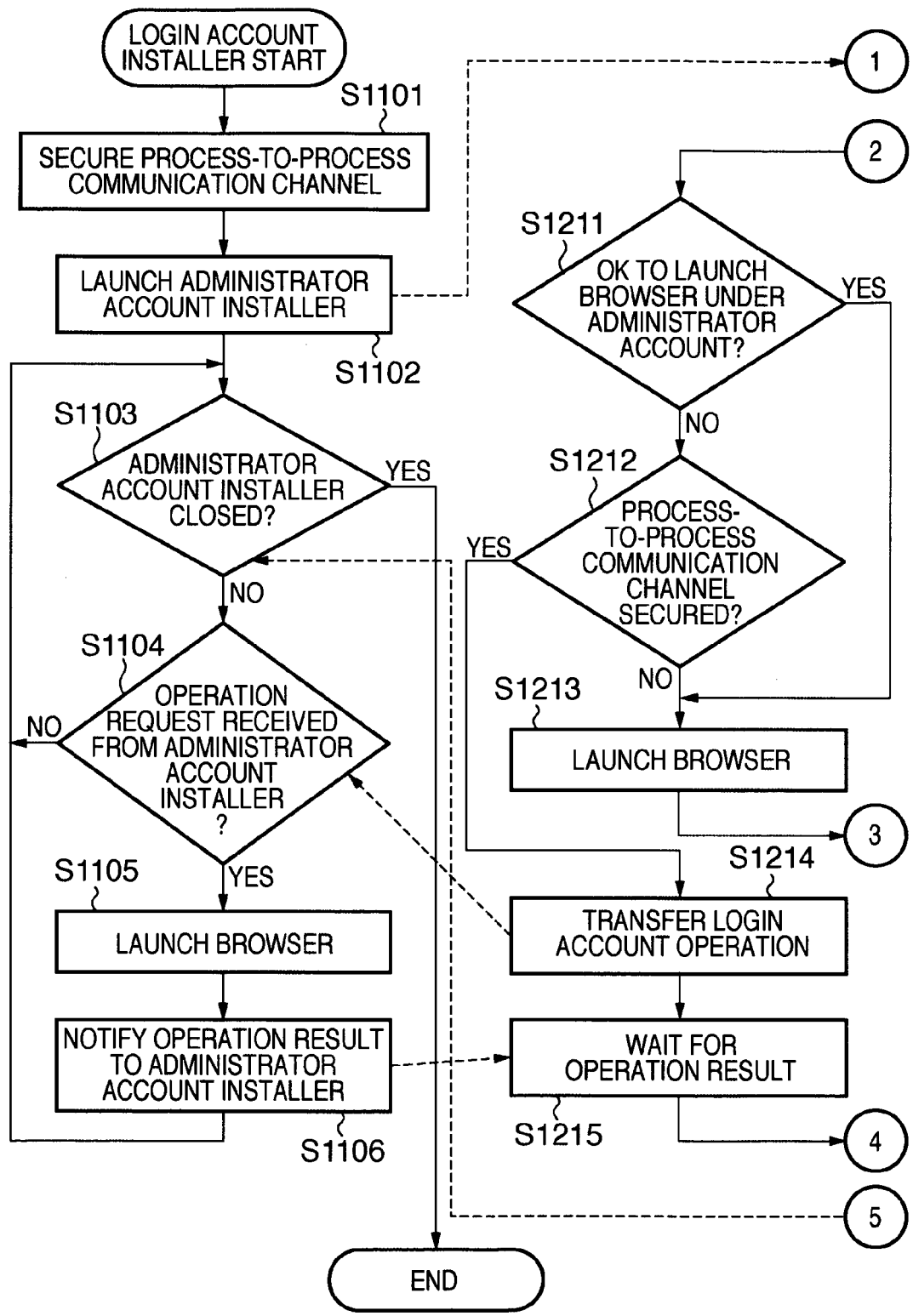

FIGS. 2A and 2B are flowcharts based on processing steps of the information processing apparatus when the master installer is run in the first embodiment. These processing steps are realized by being executed in accordance with a program read by the CPU H01 of the information processing apparatus.

In the first embodiment, the master installer is constituted by two installer, namely, a user account execution unit (hereinafter, login account installer) and an administrator account execution unit (hereinafter, administrator account installer). The user gives the instruction for execution of various operations under the login account. A login account as shown in the first embodiment indicates an account other than an administrator account. That is, a user logs in as a "restricted" administrator account (general user account), and launches the login account installer.

Steps S1101 to S1106 in FIGS. 2A and 2B are operations performed by the login account installer, and steps S1201 to S1218 are operations performed by the administrator account installer. Firstly, the operations of the login account installer will be described, followed by a description of the operations of the administrator account installer.

The login account installer executes step S1101 when the processing is started. Step S1101 is an operation to secure a communication channel with the process of the administrator account installer. Step S1101 enables communication to be secured between the operation processes of the accounts. In the first embodiment, a "named pipe" provided with the Windows NT (registered trademark) operating system is used as the method of inter-process communication. Needless to say, the present invention may use any method of inter-process communication. Inter-process communication can also be performed using methods such as message queues, signals, and shared memory, for example.

Once step S1101 is executed, the processing is proceeded to step S1102, and the administrator account installer is launched. If the login account is a general user account, the account name and password of the administrator account installer need to be entered when it is launched. If the login account is a "restricted" administrator account in the Microsoft Windows Vista (registered trademark) operating system, for example, only confirmation of whether the operation can be executed as an administrator account is required.

The next steps S1103 and S1104 form the main loop of the login account installer. In step S1103, it is determined whether or not the administrator account installer has closed. In step S1103, in order to determine whether the administrator account installer launched in step S1102 has closed, it is determined whether an end signal has been notified from the process of the installer launched in step S1102. While this is determined using a signal from a process in the first embodiment, the present invention is not constrained as to the method of process-to-process communication. For example, message queues or shared memory can also be used.

When determined in step S1103 that the administrator account installer has closed, the login account installer also closes. When determined in step S1103 that the administrator account installer is running, the processing proceeds to step S1104. In step S1104, it is determined whether or not an operation request has been received from the administrator account installer. In step S1104, content that needs processing is received via the named pipe secured in step S1101. Any parameters required in executing the operation are also received at this time.

If determined in step S1104 that an operation request has been received, the processing is transferred to step S1105. In step S1105, the operation content received in step S1104 is executed. In the first embodiment, a web browser constituting an external program is launched in step S1105. Since the operation of step S1105 is executed as the login account, the web browser is also launched and operated as the login account. In the next step S1106, the operation result of step S1105 is notified to the administrator account installer. The installation result is notified using the process-to-process communication channel secured in step S1101. The processing returns to step S1103 when the operation of step S1106 is completed, and prepares for the next content that needs processing.

The administrator account installer will be described next.

The administrator account installer is assumed to be run from the login account installer, but launching of the administrator account installer directly, rather than through the login account installer, is also envisaged.

In step S1201, the CPU H01 acquires an installation operation command. In the first embodiment, the installation operation commands are contained in an external file, but such information can also be held in a program. Also, even if they do not exist explicitly as commands, the installation operation commands may be loaded as a program in the form of different processing functions.

In the next step S1202, it is determined whether or not the installation operation command acquired in step S1201 is the Launch Browser command. If determined to be the Launch Browser command, the processing proceeds to step S1211. If not, the processing proceeds to step S1203.

In step S1203, it is determined whether or not the installation operation command acquired in step S1201 is the Launch Installer command. If determined to be the Launch Installer command, the processing proceeds to step S1204. If not, the processing proceeds to step S1205.

In step S1204, the installer is launched in accordance with instructions in the Launch Installer command, and completion of the installation operation is awaited. When the installation operation is completed, the processing proceeds to step S1205.

In step S1205, it is determined whether the installation operation command acquired in step S1201 is a file or directory operation command. If determined to be a file or directory operation command, the processing proceeds to step S1206. If not, the processing proceeds to step S1207.

In step S1206, a file create, delete or rename operation or a directory create, delete or rename operation is performed in accordance with the content of the file or directory operation command. When the operation is completed, the processing proceeds to step S1207. In step S1207, it is determined whether or not the installation operation command acquired in step S1201 is a registry operation command. If determined to be a registry operation command, the processing proceeds to step S1208. If not, the processing proceeds to step S1216. In step S1208, a registry write or delete operation is performed in accordance with the registry operation command. When the operation is completed, the processing proceeds to the next step S1216.

In step S1211, it is confirmed whether the browser can be launched under the administrator account. Specifically, the CPU H01 checks the name and version number of the executing OS in the information processing apparatus and the web browser to be launched. In the case where the executing OS and the web browser to be launched coincide with a specific OS and web browser registered in advance, it is determined that the browser needs to be launched under the login account. Here, the specific OS and web browser are assumed to have been registered in a storage area accessible by the CPU of the information processing apparatus, such as the CD-ROM storing the master installer program.

In the case where it is determined in step S1211 that the browser needs to be launched under the login account, the processing proceeds to step S1212. If not, it is determined that the browser can be launched under the administrator account, and the processing proceeds to step S1213. In the first embodiment, it is determined that the web browser needs to be launched under the login account in the case where the executing OS is Microsoft Windows Vista (registered trademark) and the default browser is IE7, for example.

In step S1212, it is confirmed whether an process-to-process communication channel has been secured. In the case where the administrator account installer has been launched directly, there will not be an process-to-process communication channel. The confirmation operation of step S1212 is performed in order to allow the browser to operate normally even in this case. If confirmed that an process-to-process communication channel has been secured, the processing proceeds to step S1214. If not secured, the processing proceeds to step S1213. In step S1213, the web browser constituting an external program is launched. Since step S1213 is executed under the administrator account, the web browser will also be run under the administrator account. When the web browser has been run, the processing proceeds to step S1203.

In step S1214, the web browser launch operation is notified to the login account installer. The operation is notified using process-to-process communication. This results in a login account operation being transferred from the administrator account installer to the login account installer.

The notification resulting from step S1214 is received by the login account installer in the above step S1104. The login account installer launches the web browser as previously described in steps S1104 to S1106, and notifies the operation result to the administrator account installer. This operation result is received by the administrator account installer in step S1215. Once the operation result is received, the processing proceeds to step S1216.

In step S1216, it is determined whether or not an error has occurred in the installation operation. If it is determined that an error has occurred, the processing proceeds to step S1217, and an installation error display is performed. After the error display, the administrator account installer is closed.

On the other hand, if it is determined in S1216 that an error has not occurred in the installation operation, the processing proceeds to step S1218. In step S1218, it is determined whether or not execution of all of the installation operation commands is completed. If it is determined that execution of all of the installation operation commands is completed, the administrator account installer is closed. If not, the processing returns to step S1201.

Figure 4A:
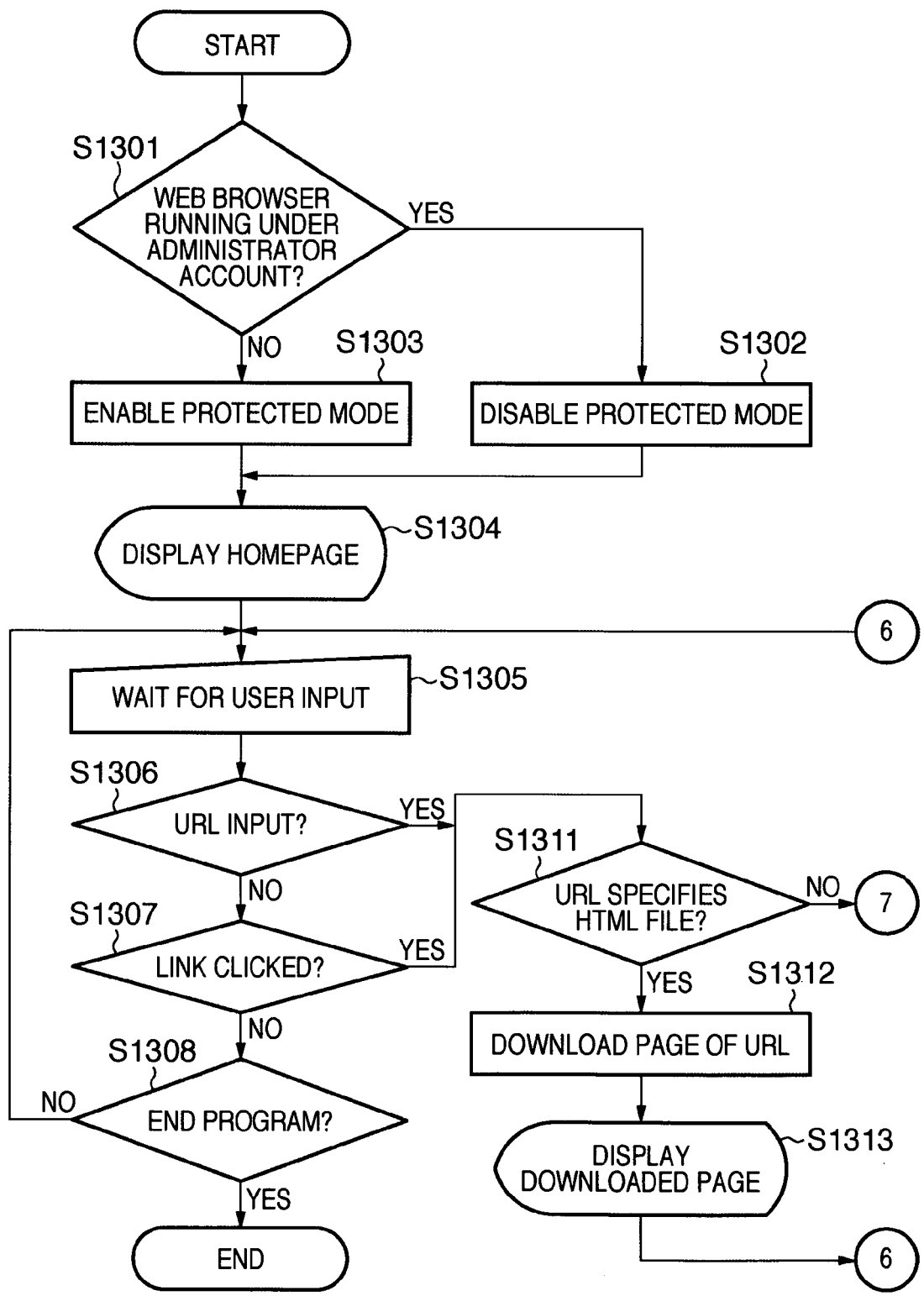
FIGS. 4A and 4B show flowcharts based on processing steps of a web browser run in the information processing apparatus of Embodiment 1.
Figure 4B:
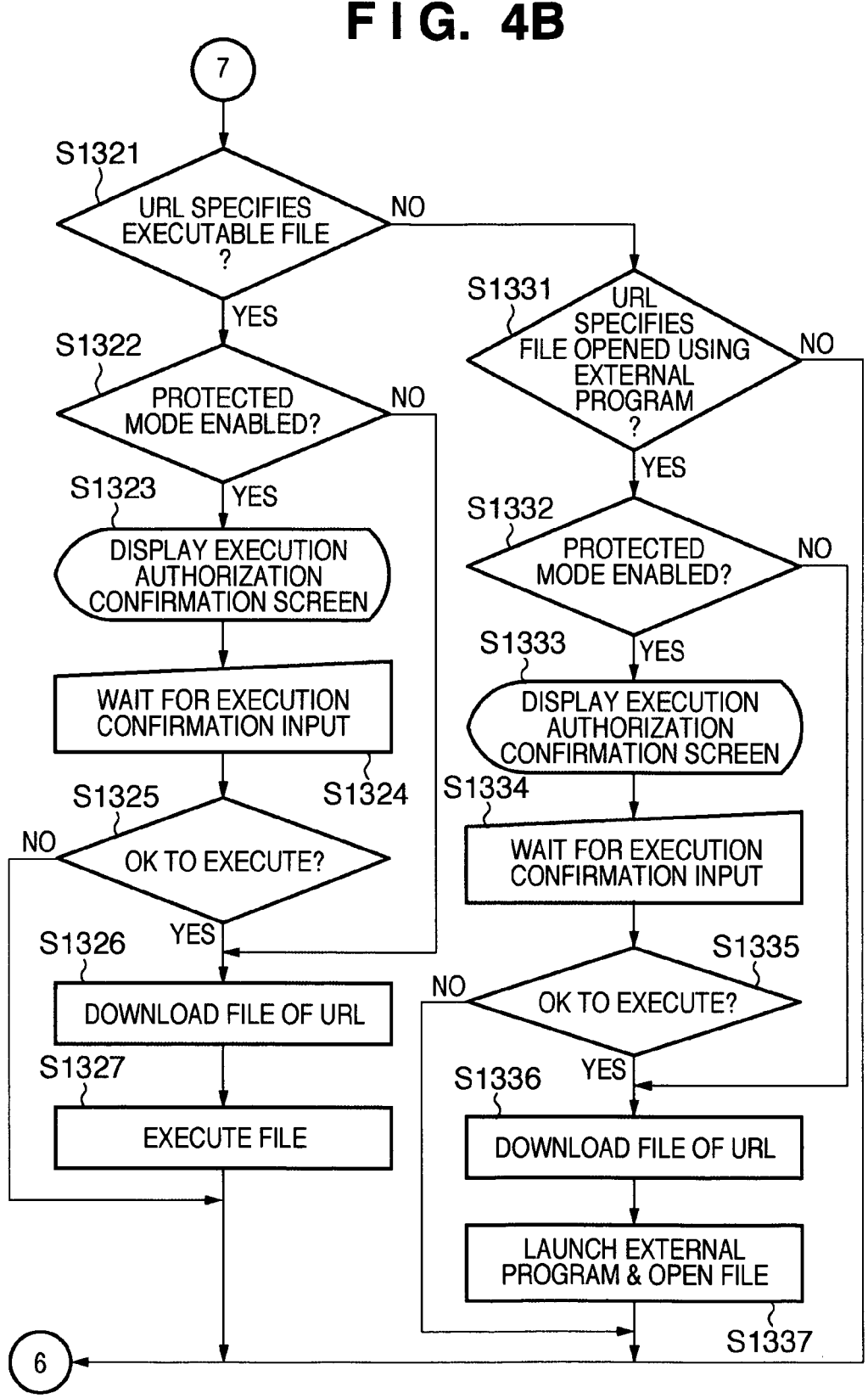

Next, the processing flow of a web browser launched from the master installer will be described. For example, a browser such as IE7 has a security mechanism called Protected Mode, but this is only enabled when the browser is run under a login account. As such, in order to enable this function, in the first embodiment the web browser is run from step S1105 constituting an operation of the login account installer. In other words, the program is run as the login account. FIGS. 4A and 4B are flowcharts showing the main operations in a web browser. The flowcharts of FIGS. 4A and 4B are defined with focus on the portion related to the first embodiment, out of the operations executed by the actual web browser.

In step S1301, it is determined whether the web browser is being run under the administrator account. If determined that the web browser is being run under the administrator account, the processing proceeds to step S1302, and a Protected Mode flag in the web browser is disabled. The processing then proceeds to step S1304.

On the other hand, when determined that the web browser is not being run under the administrator account, the processing proceeds to step S1303. In the first embodiment, it is determined that the web browser is not being run under the administrator account, since the web browser is launched from the login account installer. In step S1303, the Protected Mode flag in the web browser is enabled. The processing proceeds to step S1304, and a default homepage is displayed by the web browser.

Step S1305 onward is the main loop. In step S1305, a user input from a keyboard, a mouse or the like is acquired. In the next step S1306, it is determined whether or not the input acquired in step S1305 is a URL. If it is determined that an URL was input, the processing proceeds to step S1311. If it is determined not to be an input of a URL, the processing proceeds to step S1307. In step S1307, it is determined whether or not the input acquired in step S1305 is a click on a link resulting from a mouse click. If it is determined to be a click on a link, the processing proceeds to step S1311. If it is determined not to be a click on a link, the processing proceeds to step S1308. In step S1308, it is determined whether or not the input acquired in step S1305 is a program close instruction. If it is determined to be a program close instruction, the web browser is closed. If it is determined not to be an close instruction, the processing returns to step S1305.

In step S1311, it is determined whether or not the input URL specifies an HTML file. If it is determined to specify an HTML file, the processing proceeds to step S1312, and an HTML file (page) of the URL is downloaded. The downloaded HTML file (page) is then displayed on a screen in the next step S1313. When display is completed, the processing returns to step S1305.

On the other hand, if it is determined in step S1311 that the input URL does not specify an HTML file, the processing proceeds to step S1321. In step S1321, it is determined whether the URL specifies an executable file. If it is determined not to specify an executable file, the processing proceeds to step S1331. On the other hand, if it is determined to specify an executable file, the processing proceeds to step S1322. In step S1322, it is determined whether the internal Protected Mode flag of the web browser is enabled or disabled. If it is determined that the Protected Mode flag is disabled, the processing proceeds to step S1326. On the other hand, if it is determined that the Protected Mode flag is enabled, the processing proceeds to step S1323.

In step S1323, an execution authorization confirmation screen is displayed, and in step S1324 input of an execution confirmation is awaited. In the next step S1325, the input result of step S1324 is determined. If it is determined not to be an execution authorization instruction, the processing returns to step S1305. On the other hand, if it is determined that execution authorization is instructed, the processing proceeds to step S1326. In step S1326, the executable file specified by the URL is downloaded, and the file downloaded in step S1326 is executed in the next step S1327. When the execution is complete, the processing returns to step S1305.

In step S1331, it is determined whether the URL input in step S1306 or S1307 specifies a file that is opened using an external program file. For example, if the extension of the file specified by the URL is "doc", the file is opened using Microsoft Word (registered trademark) as an external program. Also, if, for example, the file specified by the URL is compatible with the web browser, an external program will not be required to open the file. If determined that the URL specifies a file that does not require an external program, the processing returns to step S1305.

On the other hand, if determined in step S1331 that the URL requires an external program, the processing proceeds to step S1332. In step S1332, it is determined whether the internal Protected Mode flag is enabled or disabled. If it is determined that the Protected Mode flag is disabled, the processing proceeds to step S1336.

On the other hand, when it is determined in step S1332 that the Protected Mode flag is enabled, the processing proceeds to step S1333. In step S1333, an execution authorization confirmation screen is displayed, and in the next step S1334 input of an execution confirmation is awaited. In step S1335, the input result of S1334 is determined. If it is determined that the instruction for execution authorization is not given, the processing returns to step S1305.

If it is determined in step S1335 that the instruction for execution authorization is given, the processing proceeds to step S1336, and the file specified by the URL is downloaded. In the next step S1336, an external program corresponding to the downloaded file is then launched, and the downloaded file is opened. Once the external program is launched and the file is opened, the processing returns to step S1305.

In the first embodiment as described above, the kind of operation to be launched is determined, when installing a plurality of pieces of software from a master installer. If it is determined that the operation to be launched involves launching a browser, whether the default browser in the OS of the information processing apparatus needs to be launched with a registered user account is determined. These operations enable a web browser to be run in high security mode if necessary, with little effort on the part of the user.

Second Embodiment

An embodiment of another master installer will be further described. The second embodiment covers a master installer that performs setup in an image forming apparatus such as a multi-function apparatus capable of printing and image scanning.

The second embodiment illustrates an example for avoiding problems that arise when information administered separately under a general user account and an administrator account is used, in the case where the login account is the general user account. The master installer in the second embodiment defines the installation operations as operation commands, and processes them sequentially. At this time, it is dynamically determined, according to the operation content, whether respective operation commands need to be processed under the login account or the administrator account. As a result, arbitrary commands can be executed under the login account in the second embodiment, thereby enabling resident programs to also be run as the login account, rather than only the web browser shown in the first embodiment. In the second embodiment, a scan data save program is applied as a resident program.

FIG. 7 illustrates the installation commands of the second embodiment. A command number CMD301 is a Launch Installer command for giving the instruction for an external installation program launch operation. A command number CMD302 is a Copy File command for giving the instruction for a file copy operation. A command number CMD303 is a Delete File command for giving the instruction for a file delete operation. A command number CMD304 is a Rename File command for giving the instruction for a filename change operation. A command number CMD305 is a Create Directory command for giving the instruction for a directory create operation. A command number CMD306 is a Delete Directory command for giving the instruction for a directory delete operation. A command number CMD307 is a Write Registry command for giving the instruction for a registry write operation. A command number CMD308 is a Delete Registry command for giving the instruction for a registry delete operation. A command number CMD309 is a Launch Resident Program command for giving the instruction for a resident program launch operation. A command number CMD310 is a Launch Browser command for giving the instruction for an external web browser launch operation. A command number CMD311 is a Set Printer command for giving the instruction for a default printer setting operation.

The installation commands according to the second embodiment differ from the operation commands of the first embodiment illustrated using FIG. 3, and there is no flag indicating beforehand under which account the commands need to be processed.

Since the hardware configuration applicable to the second embodiment is the same as that of the first embodiment, description thereof will be omitted.

Figure 5A:
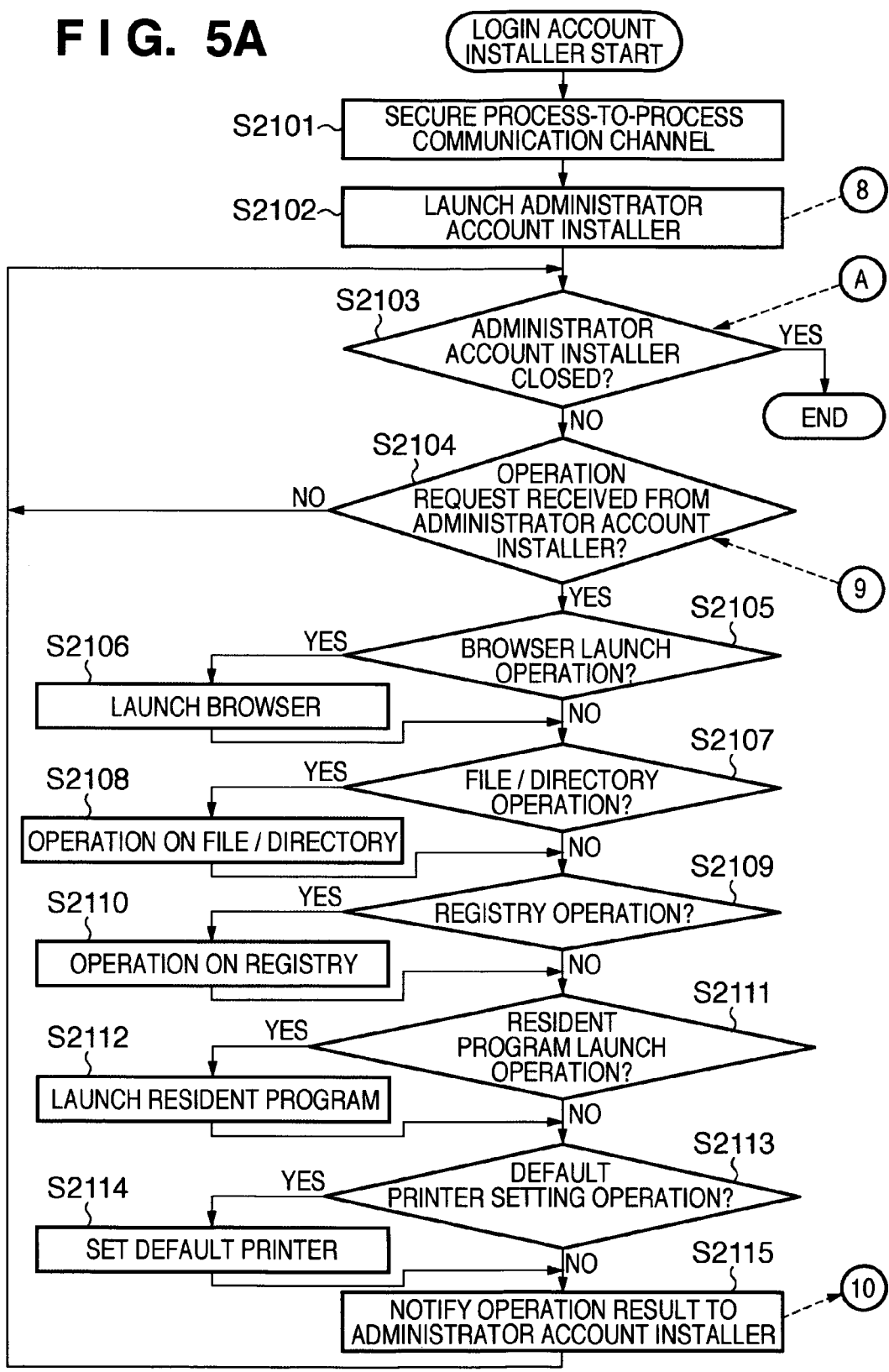
Figure 5B:
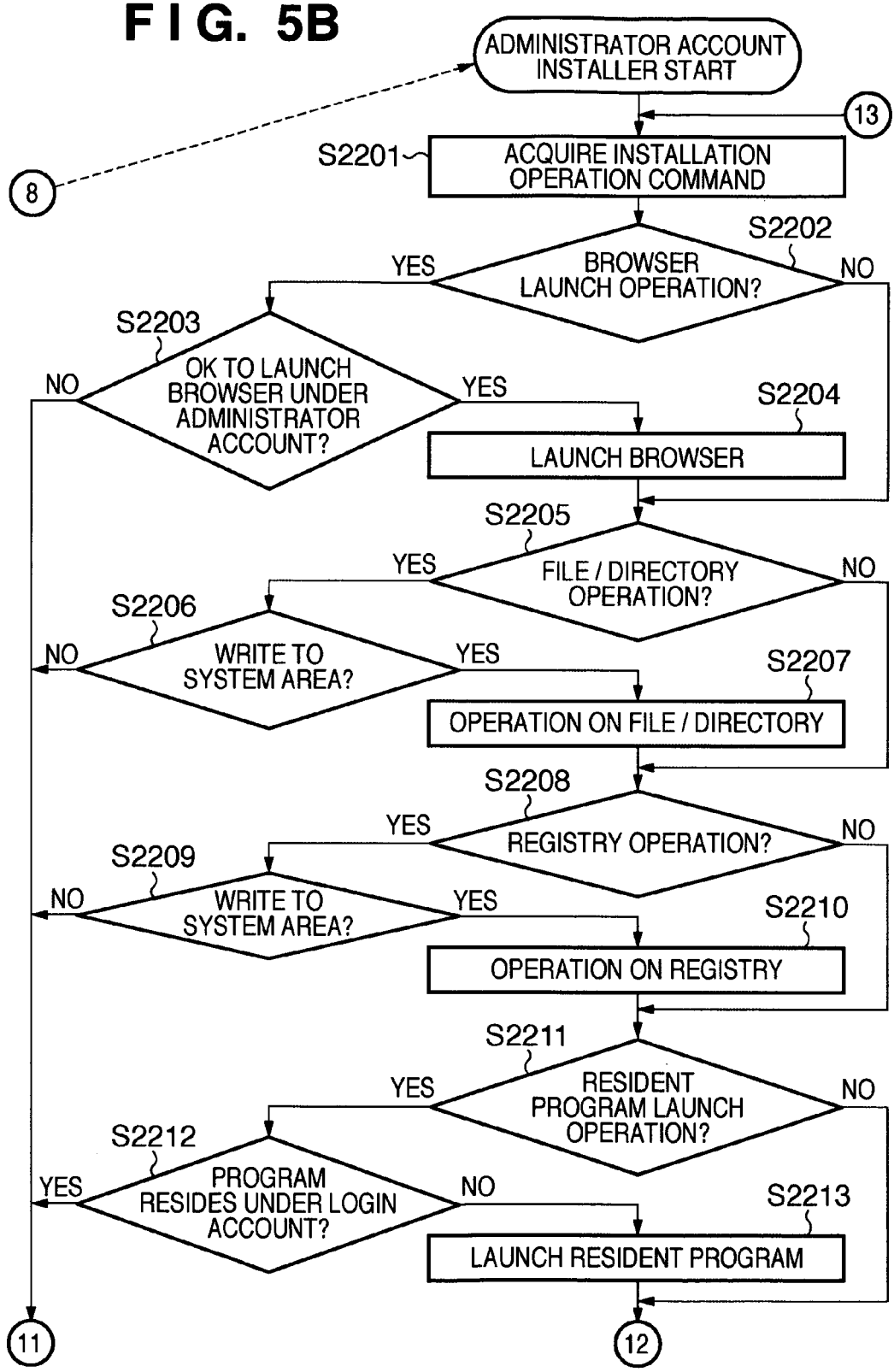

FIGS. 5A, 5B and 5C are flowcharts based on processing steps of the information processing apparatus when the master installer is run in the second embodiment. These processing steps are realized by being executed in accordance with a program read by the CPU H01 of the information processing apparatus. In the second embodiment, the master installer is constituted by two installer, namely, a login account installer and an administrator account installer, and the user runs the login account installer. Steps S2101 to S2115 in FIGS. 5A, 5B and 5C are operations performed by the login account installer, and steps S2201 to S2221 are operations performed by the administrator account installer. Firstly, the operations of the login account installer will be described, followed by description of the operations of the administrator account installer.

The login account installer executes step S2101 when the processing is started, and secures an process-to-process communication channel with the administrator account installer. In the second embodiment, a "named pipe" provided with the Windows NT (registered trademark) operating system is used as the method of process-to-process communication, for example.

Once step S2101 is executed, the processing proceeds to step S2102, where the administrator account installer is launched. At this time, the account name and password of the administrator account will need to be entered if necessary.

The next steps S2103 and S2104 form the main loop of the login account installer. In step S2103, it is determined whether the administrator account installer has closed. In step S2103, in order to determine whether the administrator account installer launched in step S2102 has closed, it is determined whether an end signal has been notified from the process of the installer launched in step S2102. If it is determined that an end signal has been notified, it is assumed that the administrator account installer has closed, and the login account installer also closes.

On the other hand, if it is determined in step S2103 that an end signal has not been notified, it is assumed that the administrator account installer is running, and the processing proceeds to step S2104. In step S2104, it is determined whether an installation operation command has been received from the administrator account installer. In step S2104, content that needs processing is received via the named pipe secured in step S2101. Any parameters required in executing the installation operation command are also received at this time. The processing proceeds to step S2105, and it is determined whether or not the installation operation command received in step S2104 is the Launch Browser command. If it is determined to be the Launch Browser command, the processing proceeds to step S2106, and a web browser constituting an external program is launched. Once the web browser is launched, the processing proceeds to step S2107.

On the other hand, if it is determined in step S2105 that the received installation operation command is not the Launch Browser command, the processing proceeds to step S2107.

In step S2107, it is determined whether or not the installation operation command received in step S2104 is a file or directory operation command. If determined not to be a file or directory operation command, the processing proceeds to step S2109.

On the other hand, if it is determined in step S2107 that the installation operation command received in step S2104 is a file or directory operation command, the processing proceeds to step S2108. In step S2108, a file create, delete or rename operation or a directory create, delete or rename operation is performed in accordance with the content of the file or directory operation command. When the operation is completed, the processing proceeds to step S2109.

In step S2109, it is determined whether or not the installation operation command received in step S2104 is a registry operation command. If it is determined not to be a registry operation command, the processing proceeds to step S2111.

On the other hand, if it is determined in step S2109 that the installation operation command received in step S2104 is a registry operation command, the processing proceeds to step S2110. In step S2110, a registry write or delete operation is performed in accordance with the content of the registry operation command. When the operation is completed, the processing proceeds to step S2111.

In step S2111, it is determined whether or not the installation operation command received in step S2104 is the Launch Resident Program command. If it is determined not to be the Launch Resident Program command, the processing proceeds to step S2113.

On the other hand, if it is determined in step S2111 that the installation operation command received in step S2104 is the Launch Resident Program command, the processing proceeds to step S2112. In step S2112, an external program is launched in accordance with the Launch Resident Program command. Since the external program is launched as a resident program, there is no need to wait for this external program to end. When the external program has been launched, the processing proceeds to step S2113.

In step S2113, it is determined whether or not the installation operation command received in step S2104 is the Set Default Printer command. If it is determined not to be the Set Default Printer command, the processing proceeds to step S2115.

On the other hand, if it is determined in step S2113 that the installation operation command received in step S2104 is the Set Default Printer command, the processing proceeds to step S2114. In step S2114, the default printer setting is changed. In this step S2114, the printer that installed the printer driver is set as the default printer. These operations of steps S2105 to S2114 are performed as the login account.

Once the operations until step S2114 have ended, the processing proceeds to step S2115 and the operation results are transmitted to the administrator account installer. When the operation results have been transmitted, the processing returns to step S2103.

The administrator account installer will be described next.

The administrator account installer acquires an installation operation command in step S2201. In the second embodiment, the installation operation commands are contained in an external file, but such information can be held in a program. Also, even if they do not exist explicitly as commands, the installation operation commands may be loaded as a program in the form of different processing functions.

In the next step S2202, it is determined whether or not the installation operation command acquired in step S2201 is the Launch Browser command. If it is determined not to be the Launch Browser command, the processing proceeds to step S2205.

On the other hand, if it is determined that the installation operation command acquired in step S2201 is the Launch Browser command, the processing proceeds to step S2203.

In step S2203, it is confirmed whether the web browser can be launched under the administrator account. Specifically, the CPU H01 checks whether the name and version number of the executing OS and the web browser to be launched have been stored in advance, indicating that the web browser needs to be launched under the login account. If, as a result of the check, it is determined that the web browser needs to be launched under the login account, the processing proceeds to step S2217.

On the other hand, when it is determined in step S2203 that the web browser can be launched under the administrator account, the processing proceeds to step S2204, and the web browser constituting an external program is launched.

In the second embodiment, it is determined that the web browser needs to be launched under the login account in the case where the executing OS is Microsoft Windows Vista (registered trademark) and the default web browser is IE7.

In the next step S2205, it is determined whether or not the installation operation command acquired in step S2201 is a file/directory operation command. If it is determined not to be a file/directory operation command, the processing proceeds to step S2208. On the other hand, if it is determined that the installation operation command acquired in step S2201 is a file/directory operation command, the processing proceeds to step S2206.

In step S2206, it is determined whether or not the target of the file/directory operation is a system area. For example, if the installation operation command is a file operation command, it is determined whether or not the target is a system area, based on a path such as a file path. In the second embodiment, it is determined whether or not the target is a system area, depending on whether the target is included in a directory related to a system acquired with an application interface (API). As another example, in the case of the UNIX (registered trademark) operating system, it is determined whether the target of the file operation is a system area, depending on whether the target is included in a directory to which only the root account has write authorities.

Here, even with the Microsoft Windows NT (registered trademark) operating system, it can be similarly determined whether or not only the administrator group has write authorities. However, a thorough check cannot be carried out, since authority settings cannot be saved with old filesystems (e.g., FAT32). Therefore, the determination as to whether the target of the file operation command is a system area is desirably performed using an API.

In the case where it is determined in step S2206 that the file/directory operation is not writing to a system area, the processing proceeds to step S2217.

On the other hand, in the case where it is determined in step S2206 that the file/directory operation is writing to a system area, the processing proceeds to step S2207, and the file/directory operation is executed in accordance with the command acquired in step S2201. Once the file/directory operation is executed, the processing proceeds to step S2208.

In step S2208, it is determined whether or not the installation operation command acquired in step S2201 is a registry operation command. If it is determined not to be a registry operation command, the processing proceeds to step S2211.

On the other hand, when it is determined in step S2208 that the installation operation command acquired in step S2201 is a registry operation command, the processing proceeds to step S2209. In step S2209, it is determined whether or not the target of the registry operation a system area. In the second embodiment, it is determined that a register having a registry path other than HKEY_CURRENT_USER is a system area. If it is determined that the target of the registry operation is not a system area, the processing proceeds to step S2217.

On the other hand, if it is determined that the target of the registry operation is a system area, the processing proceeds to step S2210. In step S2210, the registry operation is executed in accordance with the command acquired in step S2201. Once the registry operation is executed, the processing proceeds to step S2211.

In step S2211, it is determined whether or not the installation operation command acquired in step S2201 is the Launch Resident Program command. If it is determined not to be the Launch Resident Program command, the processing proceeds to step S2214.

On the other hand, if it is determined in step S2211 that the installation operation command acquired in step S2201 is the Launch Resident Program command, the processing proceeds to step S2212. In step S2212, it is determined whether or not the resident program to be launched with the Launch Resident Program command resides under the login account. More specifically, it is determined whether or not this resident program has been registered in advance as a program that needs to reside as a login account. On the other hand, if the resident program to be launched with the Launch Resident Program command has been registered as a service, it is determined that the resident program resides as an administrator account.

Here, in the second embodiment, programs that need to reside using the login account are assumed to have been registered in advance in a registry or the like as per-account startup programs.

A service is one form of resident program in a Microsoft Windows (registered trademark) operating system. A service is equivalent to a daemon in the UNIX (registered trademark) operating system.

When it is determined in step S2212 that the installation operation command acquired in step S2201 is a program residing under the login account, the processing proceeds to step S2217. On the other hand, if it is determined not to be a program residing under the login account, the processing proceeds to step S2213, and the service program is started.

In the next step S2214, it is determined whether or not the installation operation command acquired in step S2201 is the Set Default Printer command. If it is determined to be the Set Default Printer command, the processing proceeds to step S2217. On the other hand, if it is determined not to be the Set Default Printer command, the processing proceeds to step S2215.

In step S2215, it is determined whether or not the installation operation command acquired in step S2201 is the Launch Installer command. If it is determined to be the Launch Installer command, the processing proceeds to step S2216, and an installer launch operation is executed. Thereafter, the processing proceeds to step S2219. On the other hand, if it is determined in step S2215 not to be the Launch Installer command, the processing proceeds to step S2219.

Here, the operation of step S2217 will be described. As previously described, the processing proceeds to step S2217 in the case where it is determined in step S2203 that the web browser needs to be launched under the login account, or it is determined in step S2206 or S2209 not to be writing to a system area, or it is determined in step S2212 that the program resides under the login account.

In step S2217, the installation operation command acquired in step S2201 is notified to the login account installer. The login account operation is thereby transferred from the administrator account installer to the login account installer. The login account installer, on receiving the installation operation command notified from the administrator account installer, executes the operations of steps S2104 to S2115 as previously described, and notifies the operation result to the administrator account installer. The administrator account installer receives the operation result notified from the login account installer in step S2218. When notification of the operation result is received, the processing proceeds to step S2219.

In step S2219, it is determined whether or not an error has occurred in the installation operation. If it is determined that an error has occurred, the processing proceeds to step S2220, and an installation error display notifying the installation error is performed. After the error display, the administrator account installer is closed.

On the other hand, if it is determined that an error has not occurred, the processing proceeds to step S2221. In step S2221, it is determined whether or not all of the installation operation commands have been executed. When it is determined that all of the installation operation commands have been executed, the administrator account installer closes. On the other hand, if it is determined that all of the installation operation commands have not been executed, the processing returns to step S2201.

Next, the operations resulting from the scan data save program will be described as an exemplary program run from the login account installer.

The scan data save program operates as a resident program and saves image data received from a scanner to an image folder. For example, in a Microsoft Windows (registered trademark) operating system, a per-user image save folder called "My Picture" is provided. The scan data save program also desirably saves image data to a My Picture folder tailored to the login account. However, when the scan data save program is run under the administrator account, the image data gets saves to the My Picture folder of the administrator account. Using the present invention enables image data to be saved to the My Picture folder of the login account, even if the scan data save program is run under the administrator account.

Figure 6:
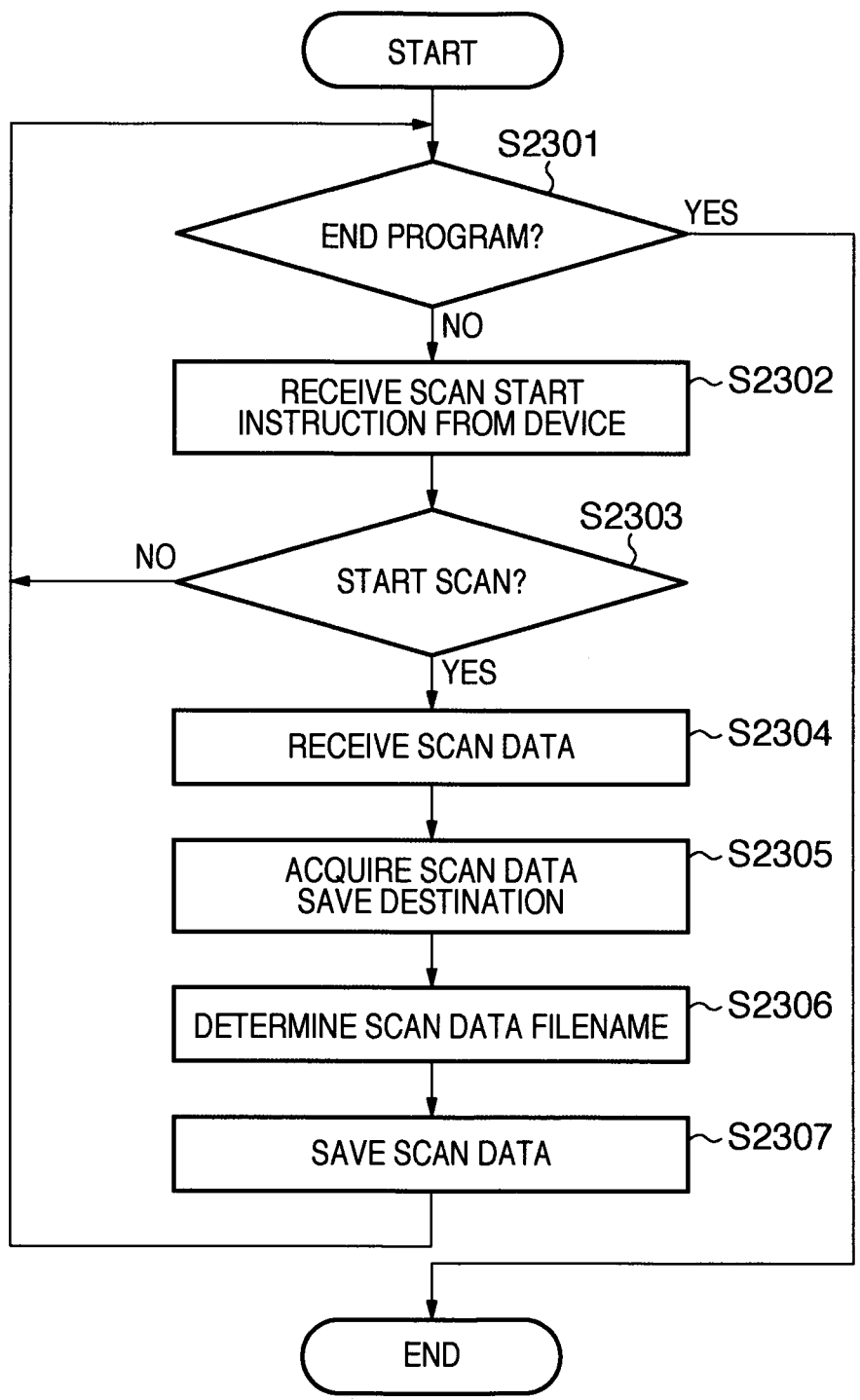
FIG. 6 shows a flowchart based on scan data save processing steps realized in the information processing apparatus of Embodiment 2.

FIG. 6 shows a flowchart based on a scan data save program for operations realized in the CPU H01 of the information processing apparatus in this second embodiment.

In step S2301, a user input is determined. Because the scan data save program is a resident program, the only user input given is a program end instruction. If the instruction for program end is given by the user input, the series of operations resulting from the scan data save program is terminated.

On the other hand, if it is determined in step S2301 that the instruction for program end has not been given, the processing proceeds to step S2302. In step S2302, reception of a scan start instruction from a device is awaited.

In step S2303, it is determined whether or not a scan start instruction was received in step S2302. When a scan start instruction has not been received, the processing returns to step S2301. On the other hand, when determined that a scan start instruction was received, the processing proceeds to step S2304, and scan data is received.

In the next step S2306, the save destination of the received scan data is acquired. Here, the directory of the image save folder of the account to which the scan data save program belongs (e.g., My Picture folder if a Microsoft Windows (registered trademark) operating system) is acquired. In the second embodiment, the image save folder of the login account will be the save destination directory, since the scan data save program is run from the login account installer.

Once the save destination of the scan data is acquired in step S2305, a scan data filename is determined in step S2306. For example, a filename in the form YYYYMMDD-hhmmss.jpeg using the date and time of when the file is saved is conceivable. YYYY is a four-digit year, MM is a two-digit month, DD is a two-digit day, hh is two digits of hour, mm is two digits of minute, and ss is two digits of second.

In the next step S2307, a scan data save operation is performed. The scan data received in step S2304 is saved to the path determined in steps S2305 and S2306. When the scan data save operation is completed, the processing returns to step S2301.

In the second embodiment, operations executed under the administrator account and other operations (part of a web browser or resident program) executed under the general user account are switched, when executing the master installer. Suitably switching the accounts enables setting operations appropriate for a user (default printer setting, etc.), data saving and the like, while appropriately launching a web browser in high security mode.

Scan data can also be saved in a suitable folder.

Third Embodiment

In the forgoing first and second embodiments, the master installer is divided into a login account installer and an administrator account installer, and the administrator account installer sorts the operations. In the third embodiment, the login account installer sorts the operations in the case where the login account is a general user account. In other words, if there is operation content that needs to be executed under the administrator account during an installation operation with the login account installer, the operation is transferred to the administrator account installer.

Since the installation commands in the present embodiment are the same as the commands shown in FIG. 7 in the second embodiment, description thereof will be omitted here.

Since the hardware configuration of the third embodiment is the same as the configuration described in the first embodiment using FIG. 1, description thereof will be omitted here.

Figure 8B:
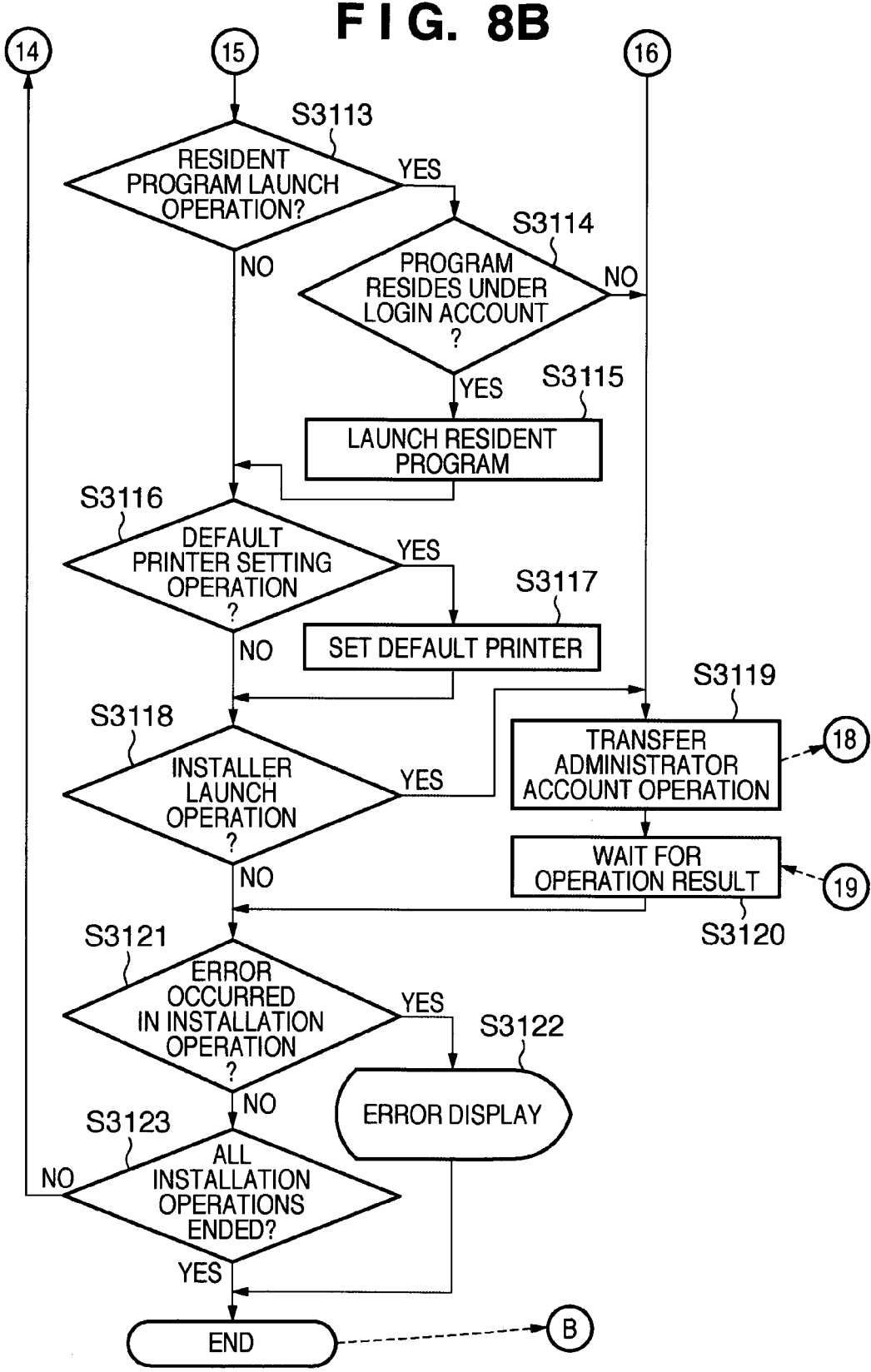

FIGS. 8A, 8B and 8C are flowcharts based on processing steps of the information processing apparatus when the master installer is run in the third embodiment. These processing steps are realized by being executed in accordance with a program read by the CPU H01 of the information processing apparatus. Firstly, the operations of the login account installer will be described.

The login account installer executes step S3101 when the processing is started, and secures an process-to-process communication channel with the administrator account installer. The administrator account installer is launched in step S3102 once the communication channel is secured, and in the next step S3103 an installation operation command is acquired. In the third embodiment, the installation operation commands are assumed to be contained in an external file. This is not limiting, and such information can be held in a program. Also, even if they do not exist explicitly as commands, the installation operation commands may be loaded as a program in the form of different processing functions.

in the next step S3104, it is determined whether or not the installation operation command acquired in step S3103 is the Launch Browser command. If it is determined that the acquired installation operation command is not the Launch Browser command, the processing proceeds to step S3107.

On the other hand, when it is determined in step S3104 that the acquired installation operation command is the Launch Browser command, the processing proceeds to step S3105. In step S3105, it is confirmed whether or not the web browser can be launched under the administrator account. Specifically, the CPU H01 checks the name and version number of the executing OS and the web browser to be launched. In the third embodiment, it is determined that the web browser needs to be launched under the login account, in the case where the executing OS is Microsoft Windows Vista (registered trademark) and the default web browser is IE7. If not, it is determined whether or not the web browser can be launched under the administrator account. If it is determined that the web browser can be launched under the administrator account, the processing proceeds to step S3119. On the other hand, if it is determined that the web browser needs to be launched under the login account, the processing proceeds to step S3106, and the web browser constituting an external program is launched. When the web browser has been launched, the processing proceeds to step S3107.

In the next step S3107, it is determined whether or not the installation operation command acquired in step S3103 is a file/directory operation command. If it is determined not to be a file/directory operation command, the processing proceeds to step S3110. On the other hand, when it is determined to be a file/directory operation command, the processing proceeds to step S3108.

In step S3108, it is determined whether or not the target of the file/directory operation is a system area. In the third embodiment, it is determined whether or not the target is a system area, depending on whether the target is included in a directory related to a system acquired with an application interface (API). As another example, in the case of the UNIX (registered trademark) operating system, for example, it can be determined whether or not the target is included in a directory to which only the root account has write authorities.

Here, even with the Microsoft Windows NT (registered trademark) operating system, it can be similarly determined whether or not only the administrator group has write authorities. However, a thorough check cannot be carried out, since authorities settings cannot be saved with old file systems (e.g., FAT32). Therefore, the determination as to whether the target of the file operation is a system area is desirably performed using an API.

In the case where it is determined in step S3108 that the file/directory operation is writing to a system area, the processing proceeds to step S3119. On the other hand, in the case where it is determined not to be writing to a system area, the processing proceeds to step S3109, and the file/directory operation is executed in accordance with the command acquired in step S3103. When the file/directory operation has been executed, the processing proceeds to step S3110.

In step S3110, it is determined whether or not the installation operation command acquired in step S3103 is a registry operation command. If it is determined not to be a registry operation command, the processing proceeds to step S3113. On the other hand, when it is determined to be a registry operation command, the processing proceeds to step S3111.

In step S3111, it is determined whether or not the target of the registry operation is a system area. In the third embodiment, it is determined that a register having a registry path other than HKEY_CURRENT_USER is a system area. If it is determined to be an operation on a system area, the processing proceeds to step S3119. On the other hand, if it is determined not to be an operation on a system area, the processing proceeds to step S3112, and the registry operation is executed in accordance with the command acquired in step S3103. When the registry operation has been executed, the processing proceeds to step S3113.

In step S3113, it is determined whether or not the installation operation command acquired in step S3103 is the Launch Resident Program command. If it is determined not to be the Launch Resident Program command, the processing proceeds to step S3116. On the other hand, when it is determined to be the Launch Resident Program command, the processing proceeds to step S3114.

In step S3114, it is determined whether or not the resident program resides under the login account. The resident program is determined to reside under the login account if it is included in a per-account startup folder or is registered as a startup program in a registry.

On the other hand, the resident program is determined to reside as the administrator account if it is registered as a service. A service is one form of resident program in a Microsoft Windows (registered trademark) operating system. A service is equivalent to a daemon in the UNIX (registered trademark) operating system.

When it is determined in step S3114 that the installation operation command acquired in step S3103 is not a program residing under the login account, the processing proceeds to step S3119. On the other hand, if it is determined to be a program residing under the login account, the processing proceeds to step S3115, and the resident program is launched. When the resident program has been launched, the processing proceeds to step S3116.

In step S3116, it is determined whether or not the installation operation command acquired in step S3103 is the Set Default Printer command. If it is determined not to be the Set Default Printer command, the processing proceeds to step S3118. On the other hand, if it is determined to be the Set Default Printer command, the processing proceeds to step S3117, and a default printer setting operation is performed. In step S3117, the default printer of the login account is set to the printer designated by the command acquired in step S3103. When the printer setting has been performed, the processing proceeds to step S3118.

In step S3118, it is determined whether or not the installation operation command acquired in step S3103 is the Launch Installer command. If it is determined to be the Launch Installer command, the processing proceeds to step S3119. If not, the processing proceeds to step S3121.

In step S3121, it is determined whether or not an error has occurred in the installation operation. When it is determined that an error has occurred, the processing proceeds to step S3122, and an installation error display is performed. After the error display, the login account installer is closed.

On the other hand, when it is determined that an error has not occurred, the processing proceeds to step S3123. In step S3123, it is determined whether or not all of the installation operation commands have been executed. When it is determined that all of the installation operation commands have been executed, the login account installer closes. On the other hand, if it is determined that all of the installation operation commands have not been executed, the processing returns to step S3101.

Here, the processing of step S3119 will be described. As previously described, the processing proceeds to step S3119 in the case where it is determined in step S3105 that the web browser needs to be launched under the administrator account, or it is determined in step S3108 or S3111 to be writing to a system area, or it is determined in step S3114 that the program does not reside under the login account, or it is determined in step S3118 to be an installer launch operation.

In step S3119, the installation operation command acquired in step S3103 is notified to the administrator account installer. The administrator account operation is thereby transferred from the login account installer to the administrator account installer. The administrator account installer, on receiving the installation operation command notified from the login account installer, executes the administrator account installer operations in the administrator account installer as will be described below, and notifies the operation result to the login account installer. The login account installer receives the operation result notified from the administrator account installer in step S3120. When notification is received, the processing proceeds to step S3121.

Next, the operations of the administrator account installer will be described. The administrator account installer, on being launched by the login account installer in the above step S3102, executes the operation of step S3201. Step S3201 and the next step S3202 form the main loop of the administrator account installer.

In step S3201, it is determined whether or not the login account installer has closed. If it is determined that the login account installer has closed, the administrator account installer is also closed, and the series of operations is terminated.

If it is determined that the administrator account installer is running, the processing proceeds to step S3202. In step S3202, it is determined whether or not notification of an installation operation command has been given from the login account installer as a result of the operation of the above step S3119. If it is determined that an installation operation command has not been notified, the processing returns to step S3201.

In step S3202, content that needs processing is received via the communication channel secured in step S3101. Any parameters required in executing the installation operation command are also received at this time.

When notification of an installation operation command from the login account installer is received in step S3202, the processing proceeds to step S3203.

In step S3203, it is determined whether or not the installation operation command received in step S3202 is the Launch Browser command. If it is determined not to be the Launch Browser command, the processing proceeds to step S3205. On the other hand, if it is determined that the received installation operation command is the Launch Browser command, the processing proceeds to step S3204, and the web browser constituting an external program is launched. Once the web browser is launched, the processing proceeds to step S3205.

In step S3205, it is determined whether or not the installation operation command received in step S3202 is a file or directory operation command. If it is determined not to be a file or directory operation command, the processing proceeds to step S3207. On the other hand, when it is determined that the received installation operation command is a file or directory operation command, the processing proceeds to step S3206, and a file create, delete or rename operation or a directory create, delete or rename operation is performed in accordance with the content of the file or directory operation command. When the operation is completed, the processing proceeds to step S3207.

In step S3207, it is determined whether or not the installation operation command received in step S3202 is a registry operation command. If it is determined not to be a registry operation command, the processing proceeds to step S3209. On the other hand, if it is determined that the received installation operation command is a registry operation command, the processing proceeds to step S3208, and a registry write or delete operation is performed in accordance with the content of the registry operation command. When the registry operation is completed, the processing proceeds to step S3209.

In step S3209, it is determined whether or not the installation operation command received in step S3202 is the Launch Resident Program command. If it is determined not to be the Launch Resident Program command, the processing proceeds to step S3211. On the other hand, when it is determined that the received installation operation command is the Launch Resident Program command, the processing proceeds to step S3210, and an external program is launched in accordance with the Launch Resident Program command. Since the external program is launched as a resident program, there is no need to wait for this external program to end. When the external program has been launched, the processing proceeds to step S3211.

In step S3211, it is determined whether or not the installation operation command received in step S3202 is the Launch Installer command. If it is determined not to be the Launch Installer command, the processing proceeds to step S3213. On the other hand, when it is determined that the received installation operation command is the Launch Installer command, the processing proceeds to step S3212, and the installer constituting an external program is launched. The operations of these steps S3201 to S3212 are executed as the administrator account.

When the installer has closed, the processing proceeds to step S3213, and the operation result is transmitted to the login account installer. The transmitted operation result is received by the login account installer as a result of the operation of the above step S3120. When the operation result has been transmitted, the processing returns to step S3201.

In the third embodiment, operations executed under an administrator account and other operations (part of a web browser or resident program) executed under a general user account are switched. Suitably switching the accounts thereby enables setting operations appropriate for a user, data saving and the like, while appropriately launching a web browser in high security mode.

Additional Embodiments

While various embodiments have been described above, the present invention may also be applied to a system constituted by a plurality of devices or an apparatus composed of a single device. For example, the present invention can be applied to a printer, a facsimile, a PC, a computer system that includes a server and a client, or the like.

The present invention is also achieved by directly or remotely supplying a software program that realizes the functions of the foregoing embodiments to a system or an apparatus, and reading out and executing the supplied program code with a computer included in the system or the like.

Consequently, the present invention is also realized by the actual program code installed on the information processing apparatus, in order to realize the functions and operations of the present invention by computer. In other words, the actual computer program for realizing the forgoing functions and operations is also one of the inventions.

In this case, provided the computer program according to the present invention has the functions of a program, the program may take any form, such as an object code, a program run by an interpreter, or script data supplied to an OS.

Storage media for supplying the program include, for example, flexible disk, hard disk, optical disk, magneto-optical disk, MO, CD-ROM, CD-R, and CD-RW. Storage media for supplying the program also include magnetic tape, non-volatile memory card, ROM, and DVD (DVD-ROM, DVD-R).

The program may also be downloaded from a homepage on the Internet using the browser of a client's information processing apparatus. That is, the actual computer program of the present invention or a compressed file including an auto-install function may be downloaded from the homepage to a recording medium such as a hard disk. The present invention is also realizable by dividing the program code constituting the program of the present invention into a plurality of files, and downloading the respective files from different homepages. In other words, a WWW server that allows a plurality of users to download program files for realizing the functions and operations of the present invention by computer may also form a constituent element of the present invention.

The program of the present invention may also be distributed to users in encrypted form stored on a storage medium such as a CD-ROM. In this case, only users that clear a prescribed requirement are allowed to download decryption key information from a homepage via the Internet, and may run the program decrypted with this key information, and install the program on the information processing apparatus.

The functions of the foregoing embodiments may also be realized as a result of a computer running the read program. Note that an OS or the like running on a computer may perform part or all of the actual processing based on instructions in the program. The functions of the foregoing embodiments can also naturally be realized in this case.

Further, the program read out from the storage medium may also be written to a memory provided in a function expansion board inserted in the information processing apparatus or a function expansion unit connected to the information processing apparatus. A CPU or the like provided in the function expansion board or the function expansion unit may performs part or all of the actual processing based on instructions in the program. The functions of the forgoing embodiment are also realized in this way.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-155374, filed Jun. 12, 2007, which is hereby incorporated by reference herein in its entirety.

The invention claimed is:

1. An information processing method of an information processing apparatus, in which an administrator account and a user account with more limited authorities in the information processing apparatus than the administrator account are registered, the information processing apparatus having a first installer running under the administrator account and a second installer running under the user account, the information processing method comprising:

launching the first installer by the second installer;

determining by the first installer whether the first installer is to perform a browser launch operation when an operation to be performed in the first installer is the browser launch operation, and when it is determined that the first installer is to perform the browser launch operation, performing the browser launch operation by the first installer, wherein, when it is determined that the first installer is not to perform the browser launch operation, transferring a command for performing the browser launch operation by the first installer to the second installer, and performing the browser launch operation by the second installer in accordance with the command, and wherein it is determined that the first installer is not to perform the browser launch operation when a predetermined browser is used.

2. The information processing method according to claim 1, further comprising securing, by the second installer, a process-to-process communication channel between the first installer and the second installer.

3. The information processing method according to claim 1, further comprising notifying the first installer, by the second installer, of a completion of the browser launch operation performed in accordance with the command when the browser launch operation performed in accordance with the command is completed, wherein the first installer terminates operation after receiving the notification of the completion of the browser launch operation performed in accordance with the command.

4. The information processing method according to claim 1, wherein the information processing apparatus comprises a master installer, which includes the first installer and the second installer.

5. A non-transitory computer-readable storage medium storing a computer program that when executed causes a computer to perform an information processing method of an information processing apparatus, in which an administrator account and a user account with more limited authorities in the information processing apparatus than the administrator account are registered the information processing apparatus, having a first installer running under the administrator account and a second installer running under the user account, the information processing method comprising:

launching the first installer by the second installer;

determining by the first installer whether the first installer is to perform a browser launch operation when an operation to be performed in the first installer is the browser launch operation, and when it is determined that the first installer is to perform the browser launch operation, performing the browser launch operation by the first installer, wherein, when it is determined that the first installer is not to perform the browser launch operation, transferring a command for performing the browser launch operation by the first installer to the second installer, and performing the browser launch operation by the second installer in accordance with the command, and wherein it is determined that the first installer is not to perform the browser launch operation when a predetermined browser is used.

6. The non-transitory computer-readable storage medium according to claim 5, further comprising securing, by the second installer, a process-to-process communication channel between the first installer and the second installer.

7. The non-transitory computer-readable storage medium according to claim 5, wherein the method further comprises notifying the first installer, by the second installer, of a completion of performing the browser launch operation in accordance with the command, in a case where performing the browser launch operation in accordance with the command is completed, and wherein the first installer closes its operation after receiving the notification of the completion of performing the browser launch operation in accordance with the command.

8. The non-transitory computer-readable storage medium according to claim 5, wherein the information processing apparatus comprises a master installer, which includes the first installer and the second installer.

9. An information processing apparatus, in which an administrator account and a user account with more limited authorities in the information processing apparatus than the administrator account are registered, having a first installer running under the administrator account and a second installer running under the user account, the information processing apparatus comprising:

a memory; and a processor in communication with the memory, the processor configured to:

launch the first installer by the second installer;

determine by the first installer whether the first installer is to perform a browser launch operation when an operation to be performed in the first installer is the browser launch operation, and when it is determined that the first installer is to perform the browser launch operation, perform the browser launch operation by the first installer, wherein, when it is determined that the first installer is not to perform the browser launch operation, transfer a command for performing the browser launch operation by the first installer to the second installer and perform the browser launch operation by the second installer in accordance with the command, and wherein it is determined that the first installer is not to perform the browser launch operation when a predetermined browser is used.

10. The information processing apparatus according to claim 9, wherein the processor is further configured to notify the first installer, by the second installer, of a completion of the browser launch operation performed in accordance with the command when the browser launch operation performed in accordance with the command is completed, wherein the first installer terminates operation after receiving the notification of completion of the browser launch operation performed in accordance with the command.

11. The information processing apparatus according to claim 9, further comprising a master installer, which includes the first installer and the second installer.

* * * * *